United States Patent [19]
Millares

[11] Patent Number: 5,656,168
[45] Date of Patent: Aug. 12, 1997

[54] METHOD OF FABRICATING INORGANIC FILTER STRUCTURES

[75] Inventor: Michel Millares, Nyons, France

[73] Assignee: Societe Anonyme: T.A.M.I. Industries, France

[21] Appl. No.: 511,856

[22] Filed: Aug. 7, 1995

[30]     Foreign Application Priority Data

Aug. 9, 1994 [FR] France ................... 94 10019

[51] Int. Cl.$^6$ ................................. B01D 29/00
[52] U.S. Cl. ............... 210/490; 210/500.25; 210/500.26; 210/510.1; 427/244
[58] Field of Search ...................... 427/244, 245, 427/246, 247; 210/496, 500.25, 500.26, 490, 510.1; 264/49.1; 55/524

[56]     References Cited

U.S. PATENT DOCUMENTS

| | | | |
|---|---|---|---|
| 3,977,967 | 8/1976 | Trulson et al. | |
| 4,356,215 | 10/1982 | Auriol et al. | 427/244 |
| 5,089,455 | 2/1992 | Ketcham et al. | 501/104 |
| 5,376,442 | 12/1994 | Davidson et al. | 210/490 X |

FOREIGN PATENT DOCUMENTS

| | | |
|---|---|---|
| 0 092 840 A1 | 11/1983 | European Pat. Off. . |
| 2 463 636 | 10/1982 | France . |
| 968078 | 8/1964 | United Kingdom . |

*Primary Examiner*—Ana Fortuna
*Attorney, Agent, or Firm*—Bacon & Thomas

[57]     ABSTRACT

The invention consists in a method of making inorganic filter structures of the type consisting in:

- in shaping and baking a porous substrate;
- in depositing on the substrate a suspension containing at least one sinterable composition designed to constitute a filter layer after baking;
- in selecting, as the sinterable composition, a powder including at least aggregates made up of individual particles; and
- in destroying the aggregates contained in the sinterable composition in such a manner as to cause the composition to be composed essentially of individual particles.

7 Claims, No Drawings

METHOD OF FABRICATING INORGANIC FILTER STRUCTURES

FIELD OF THE INVENTION

The present invention relates to the technical field of separating molecules or particles by implementing separator elements commonly known as "membranes" and made of inorganic materials.

More precisely, the invention relates to providing inorganic filter units that make it possible to concentrate, sort, or extract species of molecules or particles contained in a liquid medium that exerts a given pressure on the membrane.

A particularly advantageous application of the invention lies in the field of nanofiltration, ultrafiltration, microfiltration, filtration, and reverse osmosis.

BACKGROUND OF THE INVENTION

In conventional manner, an inorganic membrane is constituted by a porous support made mainly in the form of a tube whose inside surface is provided with at least one separating layer whose nature and shape are adapted to separate molecules or particles contained in the liquid medium flowing inside the tube. Inorganic membranes have the special feature of possessing high degrees of mechanical strength and of presenting thermal and chemical stability. Inorganic membranes thus exhibit stability and performance that are considerably better than those of the other category of membranes, namely organic membranes.

The separator layers are made by depositing a suspension on the support, the suspension including various components generally in the form of grains. The thickness of the deposit is controlled by the parameters of suspension concentration and of time of contact between the suspension and the support. The assembly is subjected to drying so that the grains come closer together, while the liquid in which they were suspended is removed by vapor pressure. To consolidate the deposit, the membrane is subjected to a baking operation.

In simplified terms, the deposit of a separator layer can be considered as a pile of spheres separated by gaps representing the initial porosity of the separator layer. The mean equivalent diameter of the pores is thus dependent on the size of the spheres.

In known manner, a technique has been proposed for depositing separator layers enabling frusto-conical pore shapes to be obtained, with the smaller diameter being in contact with the fluid to be treated. That technique makes it possible to make a membrane that is thin, so as to obtain a high transit speed for components that are not stopped by the membrane.

For inorganic membranes, the making of a conically-shaped pore requires a plurality of steps. Each of those steps comprises depositing a layer defined by its thickness and by the mean equivalent diameter of its pores. The layers are superposed on one another, each time reducing the thickness and the equivalent mean diameter of the pores. Membranes of that type are commonly referred to as "composite". By way of example, an inorganic microfiltration membrane having a separation power of 0.2 µm corresponding to the diameter of the smallest particle that cannot pass through the membrane may comprise:

- a "support" layer that is porous and that provides mechanical strength, having a thickness of 2 mm and pores of a mean equivalent diameter of 5 µm to 6 µm;
- a layer having a thickness of 80 µm and pores of a mean equivalent diameter of 1.5 µm; and
- a layer having a thickness of 50 µm and pores of a mean equivalent diameter of 0.2 µm.

In practice, deposition of each layer must be terminated before moving onto the next. As a result, fabrication of an inorganic membrane is therefore relatively lengthy. Furthermore, multiplying the number of layers in order to make it possible for the pores to tend towards a conical shape, also makes it possible to reduce penetration of one layer into the layer beneath. For example, a layer having pores of a mean equivalent diameter of 5 nm can be obtained from a suspension having grains with a mean diameter of 16.5 nm. If the deposit is performed on a layer of 6 µm, of 1.5 µm, or of 0.2 µm, then the grains penetrate fully into the pores of said layer. It is therefore difficult or even impossible to form such a deposit. Conversely, if the deposit is performed on a 50 nanometer layer, then there is little penetration and the deposit can be made.

Nevertheless, interpenetration of the layers does exist and that has an effect on the real diffusion area of the membrane and consequently on the speed with which fluid can pass through the filter element. As explained above, multiplying the number of layers reduces such penetration. Unfortunately, increasing the number of layers gives rise to a fabrication method that is relatively lengthy and expensive and reduces the transit speed. It therefore appears necessary to reduce the number of layers and to prevent them interpenetrating so as to obtain simultaneously low headloss and a real filter area that is close to the geometrical area of the filter element.

Proposals have been made in patent application FR 2 502 508 to achieve the above objects by using a material that can be eliminated thermally for the purpose of plugging the pores in the coarse layer.

Such a method suffers from the major drawback due to the fact that the technique requires prior deposition of the material that can be eliminated thermally.

Another method is described in patent U.S. Pat. No. 3,977,967 which seeks to associate a size of aggregate with the mean diameter of the pores in the substrate.

The Applicant has developed another technique that seeks to reduce the number of separation layers and to avoid them interpenetrating while still obtaining a real filter area that is close to the geometrical area of the filter element, and while also obtaining low headloss. The present invention enables this object to be achieved by implementing the suspensions used for depositing the separator layers in a special manner.

To understand the invention properly, it is essential to define accurately the following terms which are used below in the description.

Particle: a quantity of material corresponding to a monocrystal. If the material is amorphous, the particle represents the quantity of material that will give rise to a monocrystal after heat treatment.

Aggregate: An aggregate is made up of individual particles. Bonding between the individual particles is of the chemical type and it is obtained:

either during production of the powder by reaction in the gaseous, liquid, or solid state. All three states are possible since they depend on the method of synthesizing the aggregate.

With vapor phase reactions, synthesis takes place while the gas is cooling, i.e. the gas transforms into solid nuclei. If the nuclei remain individualized, then individual particles are obtained. Very frequently, the nuclei coalesce to give rise to an aggregate. Within such an aggregate, there exists some quantity of material between the various nuclei.

For liquid medium reactions, the product formed is generally an amorphous precipitate. The precipitate is in the form of a microporous solid having large specific area and can be represented as an assembly of individual particles.

For solid medium reactions, the size of the products formed depends on the distance between the metal atoms within the precursor molecule of the solid medium.

or else, by solid state reaction between individual particles that have already been formed. Particles are subjected to heat treatment, thereby considerably reducing particle viscosity and enabling matter to be interchanged with neighboring particles. After cooling, the aggregate made in this way is either in amorphous form or else in crystalline form. In either case, some quantity of material exists between the original individual particles.

To sum, an aggregate may be defined as an assembly of individual particles such that there exists continuity of particle matter between particles that are adjacent within the aggregate.

Cluster: clusters are formed in two different ways:

a) Chemically by the action of inorganic salts or of ionic polyelectrolytes that encourage particles to assemble together.

Cluster formation depends on the interactions that are possible between the particles. Each particle in suspension carries electrical charge on its surface that is the result either of small imperfections in its crystal lattice or else of adsorbing ions. The electrically charged surface then attracts ions of opposite sign to attempt to achieve an electrically neutral state. As a result, a layer of liquid that is enriched in ions of sign opposite to the charge on the particle collects around the solid and the resulting charge depends on the nature and the concentration of ions in the liquid in suspension. There thus exists an ion concentration for which the resulting charge of the particle is zero (the isoelectric point). Within a suspension, all of the particles have identical charge. The forces between the particles are thus mainly repulsive. It is necessary to add reagents capable of neutralizing surface charge so as to achieve an electrically neutral state. Under such conditions, the effectiveness of attractive forces is important. The various attractive forces are as follows:

Van Der Waals forces due to interactions between molecules or atoms;

surface tension forces; and chemical forces due to chemical bonds between particles.

Van Der Waals forces are interactions between the atoms and the molecules of the particles. They depend on crystal properties and dissolved ions have little influence on their magnitude. Surface tension forces appear only in a liquid mixture. Chemical forces originate from hydrogen or covalent type bonds.

b) Physically where the particles are fixed by chemical bridges on molecules that are very long.

Macromolecules having a molar mass of several million Daltons have real backbone lengths that are much longer than those of individual particles. In addition, it is possible to determine solvation conditions for such molecules so that their backbones are fully stretched and so that there exist chemical groups all along the backbone capable of attaching particles. Under such conditions, a molecule backbone is capable of collecting a plurality of individual particles to form a cluster. Bonding between the backbone and a particle is purely chemical and is of the hydrogen or covalent type. In spite of the bonding being of the chemical type, this method of forming clusters is known as the "physical" method.

To sum up, a cluster is an assembly of particles in which there is no continuity of particle matter between adjacent particles within the cluster.

Layer: the purpose of a layer is to perform separation in a population of molecules or particles. It is defined as a continuous stack of particles and/or aggregates and/or clusters. The voids inside the stack constitute the porosity of the layer. The system whereby porosity is measured treats such voids as stacks of cylinders that are mutually parallel. Pore diameter thus represents the diameter of the cylinders that are equivalent to the porosity.

Porosity: the volume of the voids within a stack. It is characterized as the ratio of void volume divided by total volume.

Equivalent pore diameter: the diameter of the cylinders equivalent to the porosity.

In the majority of cases, suspensions used for depositing separator layers are made up of mixtures of particles, aggregates, and clusters. The Applicant has the merit of showing that the porosity of the layer depends on the nature of the components from which the separator layers are built up. Thus, it has been observed that a deposit made of aggregates, in particular when made by the technique of patent U.S. Pat. No. 3,977,967, gives rise to a pore distribution that is non-uniform and that is spread over a wide range because of the combination of porosity between aggregates and also porosity within aggregates. In contrast, a pore distribution that is uniform and that has a narrow spread can be obtained when making a deposit from particles.

OBJECT AND SUMMARY OF THE INVENTION

The object of the invention is thus to propose a method of making filter structures or membranes consisting:

in shaping and baking a porous substrate; and in depositing on the substrate a suspension containing at least one sinterable composition designed to constitute a filter layer after baking.

According to the invention, the method consists:

in selecting, as the sinterable composition, a powder including at least aggregates made up of individual particles; and in destroying the aggregates contained in the sinterable composition in such a manner as to cause the composition to be composed essentially of individual particles.

According to a characteristic of the invention, it has been shown that deposits obtained from clusters generally give rise to uniform pore distribution. It has been observed that such deposits are little different from those obtained from particles because clusters possess mechanical strength that is much less than that of aggregates. Thus, during drying, compression forces break up the clusters. Nevertheless, the spread of pore distribution may be greater than that of pore distribution in a deposit of particles.

The invention thus provides a method consisting in using the suspension containing individual particles as obtained after the destruction operation, and in building clusters from said individual particles, thereby enabling individual particles to be assembled together without continuity of the matter from which the individual particles are made.

Various other characteristics appear from the following description given with reference to non-limiting examples showing embodiments and implementations of the invention.

The invention thus relates to a method of making or fabricating filter structures that consist in shaping and baking a porous substrate constituting a support for providing the mechanical strength of the membrane. The porous substrate made in this way is rigid or non-deformable and is made of a material which opposes through passage in a manner adapted to the separation which is to be performed. The porous substrate is made of inorganic materials such as metal oxides, carbides, metals, nitrides, or carbon.

In accordance with the invention, at least one sinterable composition is deposited on the porous substrate in such a manner as to constitute a filter layer, after baking. In accordance with the invention, the sinterable composition is selected from a powder including at least aggregates made up of individual particles as defined above. The composition is made up in conventional manner for producing inorganic filter membranes. The composition contains at least one metal oxide.

Thereafter, the method consists in destroying the aggregates contained in the sinterable composition so that it is essentially made up of individual particles. It should be considered that aggregate destruction is for the purpose of breaking up powders having a diameter lying in the range 3 nm to 500 nm. Aggregate destruction relies on using a ball mill operating in cascade mode.

The following description gives an example of making ultrafiltration layers out of zirconia. The zirconia powder used is tetragonal structure yttrified zirconia. As a sinterable composition, a powder is used comprising 50 $m^2/g$ of a solid solution of zirconium oxide and of yttrium oxide. Such a powder is made up of individual particles having a size of about 20 nm, whereas the aggregates contain up to about ten individual particles, thus corresponding to a size of about 0.2 μm.

According to a characteristic of the invention, aggregate destruction to obtain a composition that is essentially made up of individual particles consists in breaking up the aggregates by means of a mill operating in cascade mode. To break up aggregates of this type using the balls in the mill, it is necessary for the probability of an aggregate being present in the collision zone between two balls to be high. There follow examples showing the effectiveness of the milling at destroying aggregates in the method of the invention. This effectiveness is determined by measuring:

filter time TF;

pore diameter in the deposits; and the stop rate of membranes to be made with such deposits.

The membranes were made by adding organic binders to the suspension after milling so as to make deposits without cracking. The binders comprised polyvinyl alcohols, cellulose esters, or polyethylene glycols. The deposits were made on 0.1 μm microfiltration membranes.

Experimental conditions were as follows:

for TF:
 a 0.45 μm Millipore filter
 concentration of 1 gram per liter (g/l)
 filtered volume 50 ml
 driving force 400 torrs for pore diameter: after milling the suspension was allowed to dry. The dry product was heat treated with the corresponding membranes, and then characterized by means of a mercury porosity meter;

for stop rate: Dextrans type calibration molecules were used (i.e. polysaccharide molecules of accurate molecular mass). The molecular mass used was 70,000 D at a concentration of 0.5 g/l;

for milling: the concentration during milling was 68 g/l and the ratio of milling balls over powder mass was 26.

Table 1 gives the observed results.

| Milling duration (h) | TF (s) | Pore Ø (nm) | Stop rate (%) |
|---|---|---|---|
| 0 | 50 | — | — |
| 1 | 200 | 15 | 50 |
| 2 | 500 | 15 | 60 |
| 3 | 800 | 13 | 70 |
| 4 | 1000 | 13 | 85 |
| 5 | 1100 | 12 | 90 |
| 6 | 1150 | 11 | 95 |
| 7 | 1160 | 11 | 96 |

However long milling lasts, the resulting membranes thus present excellent separation performance.

According to another characteristic of the invention, to further improve separation effectiveness, it may be envisaged to add a centrifuging operation to that of destroying aggregates, for the purpose of obtaining greater particle fineness. Table 2 below shows the advantage of this type of operation.

Experimental conditions were as follows:

after being milled for 7 hours, the suspension was centrifuged;

two relative centrifugal forces were used: 50 g and 2000 g;

organic binders identical to those used in the examples of Table 1 were added to each of the suspensions.

Comparison criteria were the following:

TF;

pore diameter; and retention rate using Dextran having a molar mass of 10,000 D at a concentration of 0.5 g/l.

| Relative centrifugal force (g) | TF (s) | Pore Ø (nm) | Retention rate (%) |
|---|---|---|---|
| 50 | 1300 | 11 | 40 |
| 2000 | 2600 | 6 | 90 |

Centrifuging at 50 g provides little improvement in the evaluation criteria. However, centrifuging at 2000 g gives rise to a mean pore diameter that is smaller by a factor of about 2, whereas TF and retention rate are increased. Using both milling and centrifuging makes it possible to control particle size and consequently the mean diameter of the pores and the effectiveness of the resulting membrane.

According to another characteristic of the invention, after aggregate destruction for the purpose of obtaining particles, the method may consist in making up clusters from the individual particles and a suspension that enables individual particles to be assembled together but without continuity of the matter from which the individual particles are made. When a particle or an aggregate is put into the presence of a polar liquid such as water, then electrons are interchanged between the surface of the particle or the aggregate and the water. This interchange tends to create a layer of water that is chemically bonded to the particle or the aggregate so as to achieve an electrically neutral system. In turn, the layer achieves electrical equilibrium with the surrounding water. The first layer which depends only on the presence of charge on the surface of the particle or aggregate is of constant thickness. The thickness of the second layer depends on the presence of ions in the surrounding water. Thus, to achieve electrical neutrality, the smaller the quantity of ions, the greater its volume. The existence of such layers causes forces to appear between the particles or aggregates which, as a function of the ionic force and of the nature of the ions may be an attractive force or a repulsive force. When attractive forces predominate, the particles or aggregates collect together to form a cluster. The bonds with the surrounding liquid are weak and viscosity is increased. When repulsive forces predominate, the particles or aggregates repel one another mutually and the system is totally dispersed with high viscosity. When both types of force are in equilibrium, the particles or aggregates remain dispersed and viscosity is very low. Thus, one way of building up clusters consists in defining the ion environment so that attractive forces are maximized. The size of a cluster is thus independent of the milling energy since immediately after breakup, bonding forces of electrical origin immediately reform the cluster. Another way of building up clusters consists in using macromolecules having surface functions (polyelectrolytes). The real size of such macromolecules is greater than the size of the particles or the aggregates. The particles or aggregates can therefore attach themselves to the surface functions on the molecular backbone, thereby making up a cluster. This type of cluster is formed by bonding between the particle or aggregate and surface functions of the macromolecule. It too is therefore dependent on the ion environment in the liquid medium.

The description below relates to making up clusters from the suspension used in the above example after milling for 7 hours. The deposits were made on microfiltration membranes having pores with a diameter of 0.2 μm or of 0.1 μm. The clusters were built up by varying pH. Prior to deposition, the same organic binders as those of Tables 1 and 2 were added to each suspension. The comparison criteria for each of the substrates were as follows:

TF;

pore diameter;

retention rate, using Dextran having a molar mass of 70,000 D and at a concentration of 0.5 g/l; and water permeability of the membranes.

Table 3 shows how the comparison criteria varied.

| pH | TF | Mean pore ∅ (nm) | Retention rate (%) | Water permeability (l/hm$^2$b) |
|---|---|---|---|---|
| Substrates with 0.2 μm pore diameter | | | | |
| 4 | 1160 | 11 | 96 | 150 |
| 5 | 850 | 12 | 60 | 250 |
| 6 | 300 | 13 | 40 | 350 |
| Substrates with 0.1 μm pore diameter | | | | |
| 4 | 1160 | 11 | 97 | 180 |
| 5 | 850 | 11 | 65 | 200 |
| 6 | 300 | 13 | 50 | 330 |

When the pH increases and regardless of the substrate, it can be seen that there is a significant decrease in TF and in retention rate. However, mean pore diameter varies little. In fact, this table does not show the spread in pore distribution which increases with pH. Thus, the number of pores having diameters greater than the mean diameter increases with pH, thereby explaining the significant drop in retention rate.

For a pH of 4, the 0.1 μm substrate makes it possible to obtain water permeability greater than that of the 0.2 μm substrate. This difference is explained by greater penetration of particles or aggregates into the 0.2 μm substrate compared with the 0.1 μm substrate. Intermediate resistance is thus established which corresponds to the penetration zone.

When pH increases, clusters form, thereby limiting penetration into the substrates. This intermediate penetration becomes practically zero. Permeability then depends only on the resistances of the deposit and of the substrate. Under such conditions, and using the same deposit, higher permeability corresponds to the substrate having the lower resistance. The values in Table 3 show that this applies for pHs of 5 and 6. By limiting penetration, clusters thus make it possible to increase permeability.

The following description relates to another implementation of the invention whereby microfiltration layers having a pore diameter of 0.2 μm are made from aluminum oxide. Conventionally, a 0.2 μm layer has been deposited on a 1.5 μm layer. The presence of the 0.5 μm layer has the drawback of increasing the hydraulic resistance of the membrane. The technique of the invention whereby the size of particle assemblies is controlled makes it possible to achieve a significant reduction in the value of hydraulic resistance since the 0.2 μm layer can be deposited directly on a support having a mean pore diameter of 5 μm. The making of such a suspension comprises two steps, namely eliminating aggregates and controlled building of clusters.

The basic substance is the aluminum oxide manufactured by Pechiney under the reference XA 15. The operation of eliminating aggregates and clusters consists in milling the basic product in suspension in water in the presence of a deflocculating agent. The purpose is to destroy aggregates while avoiding building clusters. The deflocculating agent used is known under the commercial name Darvan C. The suspension is placed in a ball mill operating in cascade mode. Milling is performed until the filtration time reaches a value that is independent of milling duration. Under such conditions, aggregates have been destroyed and the presence of the deflocculating agent has prevented clusters from forming.

The operation of controlled cluster building consists in making an aqueous solution of a carboxyvinyl polymer. According to the invention, it should be observed that after neutralization, the ionized functions of the molecular backbone react strongly with the surface charge on the aluminum oxide. Clusters thus appear of a size that can become large and that varies as a function of the concentration of carboxyvinyl polymer. The invention optimizes the size of the clusters relative to the diameter of the pores in the substrate. This optimization is achieved via TF. The parameters of this test comprise:

filter having a mean pore diameter of 5 μm (identical to that of the support);

concentration for measuring TF: 1 g/l;

filtered volume: 50 ml;

filter pressure: 400 torrs.

Table 4 below shows how TF varied as a function of carboxyvinyl polymer concentration.

| Polymer concentration (ppm) | TF (s) |
|---|---|
| 0 | 20 |
| 100 | 50 |
| 300 | 120 |
| 500 | 250 |
| 1000 | 350 |
| 1500 | 370 |
| 2000 | 380 |
| 5000 | 410 |

For a filter having a pore diameter of 5 μm, the filter time of a deflocculated aluminum suspension is very short, since the suspension passes through the filter. The filtrate is entirely white and no deposit is visible on the filter. This result shows that depositing a deflocculated suspension of aluminum oxide without aggregates is not possible on a 5 μm substrate.

In the presence of an increasing quantity of carboxyvinyl polymer, TF increases to an asymptotic value of about 410 s. This increase is the consequence of clusters forming that do not penetrate into the filter, and also of the viscosity of the suspension. For TF with a value of 250 s or greater, filtrates are clear and a deposit is visible on the filter. Using these results, a suspension was made containing 5,000 ppm of carboxyvinyl polymer. The suspension was deposited on an alumina support having a pore diameter of 5 μm. The mass deposited was 80 g/m$^2$. After drying, the substrate and its deposit were subjected to heat treatment at 1350° C. To show the advantage of clusters, a second suspension identical to the above was made, i.e. in the presence of a deflocculating agent and after performing the milling operation that destroyed the aggregates. Since it is not possible to deposit such a suspension directly on a 5 μm support, the substrate used was a membrane having a mean pore diameter of 1.5 μm. The technology used for making membranes having a mean pore diameter of 0.2 μm was conventional. As above, the mass deposited was 80 g/m$^2$ and the sintering temperature was 1350° C.

The permeability values obtained by those two types of membrane were as follows:

4 m$^3$/(hm$^2$b) for the suspension in the presence of clusters deposited on the 5 μm substrate; and 2.5 m$^3$/(hm$^2$b) for the deflocculated suspension deposited on the 1.5 μm substrate.

This considerable difference in permeability for a membrane having pores of the same diameter shows the advantage of making clusters so as to avoid penetration into the substrate. In addition, making 0.2 μm membranes is easier in the presence of clusters since it avoids the additional operation of making a 1.5 μm layer.

From the examples described above, the invention consists in destroying as much as possible aggregates of particles contained in at least one suspension so as to deposit it on a porous substrate. Prior to depositing said suspension(s), provision may be made for building clusters from the particles obtained after the milling operation.

I claim:

1. A method of making inorganic filter structures, consisting essentially of the following steps:
   (a) shaping and packing a porous substrate,
   (b) selecting a powder of a sinterable composition which comprises aggregates of individual particles,
   (c) destroying the aggregates in the sinterable composition so that the sinterable composition substantially comprises individual particles,
   (d) treating the individual particles to produce clusters of individual particles, the clusters having substantially no continuity of particle matter between adjacent particles within the cluster,
   (e) forming a suspension comprising the sinterable composition,
   (f) depositing the suspension onto the substrate, and
   (g) baking the substrate to form a filter layer of the sinterable composition on the substrate.

2. The method according to claim 1, wherein step (c) further comprises centrifuging the individual particles with a relative centrifugal force in the range of 50 g to 4000 g.

3. The method according to claim 1, wherein the suspension recited in step (e) has a pH in the range of 2 to 13, thereby enabling cluster size to be controlled.

4. The method according to claim 1, wherein the suspension recited in step (e) comprises polyelectrolytes having molar masses in the range of 500 to 3,000,000, thereby enabling cluster size to be controlled.

5. The method according to claim 1, wherein the aggregates have a diameter of about 0.2 μm and the individual particles have a diameter of about 20 nm.

6. The method according to claim 1, wherein the aggregates have a diameter of about 0.2 μm and the individual particles have a diameter of about 20 nm.

7. A filter structure, obtained by the method of claim 1.

* * * * *